United States Patent Office 3,242,167
Patented Mar. 22, 1966

3,242,167
CERTAIN 11-SUBSTITUTED AMINO-5,6-DIHYDRO-6-OXO-MORPHANTHRIDINE COMPOUNDS
Wilson Shaw Waring, Macclesfield, England, assignor to Imperial Chemical Industries Limited, London, England, a corporation of Great Britain
No Drawing. Filed Sept. 9, 1963, Ser. No. 307,352
Claims priority, application Great Britain, Sept. 24, 1962, 36,192/62
4 Claims. (Cl. 260—239.3)

This invention relates to heterocyclic derivatives and more particularly it relates to morphanthridine derivatives which possess therapeutic properties and particularly anticonvulsant properties.

According to the invention we provide morphanthridine derivatives of the formula:

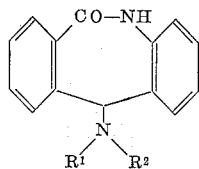

wherein $R^1$ and $R^2$, which may be the same or different, stand for hydrogen or for alkyl radicals each containing not more than 4 carbon atoms or they may be joined together to form, with the adjacent nitrogen atom, a heterocyclic ring, and wherein the benzene nuclei may optionally bear one or more substituents, and pharmaceutically acceptable salts thereof.

As suitable alkyl radicals there may be mentioned for example methyl, ethyl, propyl and butyl radicals. The radicals $R^1$ and $R^2$, together with the adjacent nitrogen atom, may be for example a piperidino ring.

It is to be understood that either of the alkyl radicals $R^1$ or $R^2$ may optionally be substituted for example by a hydroxy radical. The optional substituents in the benzene nuclei may be for example halogen radicals such as chlorine or bromine radicals.

Particularly useful compounds of this invention are 5,6-dihydro-11-diethylamino-6-oxo-morphanthridine, 5,6-dihydro-11-dimethylamino-6 - oxo - morphanthridine and 5,6-dihydro-11-piperidino-6-oxo-morphanthridine.

According to a further feature of the invention we provide a process for the manufacture of the said morphanthridine derivatives which comprises interaction of a compound of the formula:

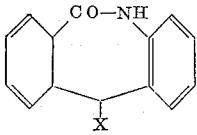

wherein X stands for a replaceable substituent and wherein the benzene nuclei may optionally be substituted as indicated above, and an amine of the formula:

NHR¹R² wherein $R^1$ and $R^2$ have the meaning stated above.

The replaceable substituent X may be, for example, a chlorine, bromine or iodine atom or it may be a toluene-sulphonyloxy radical.

The reaction may conveniently be carried out in the presence of a diluent or solvent which may be an excess of one of the reactants used in the process or it may be for example dimethylformamide. The reaction may also be carried out in the presence of an acid-binding agent which may be an excess of the amine used as starting material or it may be a tertiary organic base for example pyridine or triethylamine. The reaction may be accelerated or completed by the application of heat.

The halogeno compounds used as starting material may be obtained from the corresponding 11-hydroxymorphanthridine derivatives by reaction with a suitable halogenating reagent such as thionyl chloride, phosphorus oxychloride, thionyl bromide or phosphorus tribromide. The iodo derivatives may be prepared from the corresponding bromo derivatives by reaction with potassium iodide. The 11 - hydroxymorphanthridine derivatives themselves may be obtained by reduction of the corresponding 11-oxo-morphanthridine derivatives by means of sodium borohydride in the presence of a diluent or solvent such as methanol and at a temperature of about 0–20° C.

As stated above, the compounds of this invention possess anticonvulsant properties. Thus for example the preferred compounds are effective in protecting rats and mice against electrically induced seizures when used at a dosage of about 25–50 mg./kg. of body weight and it is thus reasonable to believe that the compounds will be useful for the treatment of epilepsy, particularly grand mal epilepsy, in man.

Thus according to a further feature of the invention we provide pharmaceutical compositions wherein the active ingredient is at least one compound of the formula:

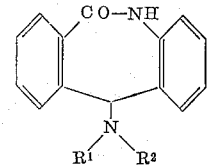

wherein $R^1$ and $R^2$ have the meaning stated above and wherein the benzene nuclei may optionally be substituted as indicated above, or a salt thereof, in admixture with pharmaceutically acceptable diluents or carriers therefor.

The said pharmaceutical compositions may be for example tablets, pills, capsules, aqueous or oily solutions, aqueous or oily suspensions, emulsions, injectable aqueous or oily solutions or suspensions, dispersible powders and suppositories. The compositions intended for oral administration to man for example tablets, pills or capsules may contain between about 0.1 gm. and about 1.0 gm. of active ingredient and preferred oral compositions for use in man are those containing about 250 mg. of active ingredient.

The invention is illustrated but not limited by the following examples in which the parts are by weight:

*Example 1*

8 parts of 11-chloro-5,6-dihydro-6-oxo-morphanthridine are added gradually to 80 parts of diethylamine with cooling and stirring. When the exothermic reaction is over, the reaction mixture is heated under reflux for 30 minutes and is then cooled and filtered. The filtrate is distilled under reduced pressure and the solid residue so obtained is stirred with water and the mixture is filtered. The solid residue is crystallised from benzene or from aqueous ethanol and there is thus obtained 11-diethylamino-5,6-dihydro-6-oxo-morphanthridine, M.P. 159–160° C., after drying at 100° C.

In a similar way using di-n-propylamine as starting material in place of diethylamine there is obtained 11-di-n-propylamino-5,6-dihydro-6-oxo-morphanthridine, M.P. 154–156° C. (from methanol).

The 11-chloro-5,6-dihydro-6-oxo-morphanthridine used as starting material may be obtained as follows:

A mixture of 11 parts of 5,6-dihydro-11-hydroxy-6-oxo-morphanthridine, 50 parts of chloroform and 6 parts of thionyl chloride is heated under reflux for 30 minutes, and is then cooled and filtered. The solid residue is 11-chloro-5,6-dihydro-6-oxo-morphanthridine, M.P. 226° C. with decomposition, unchanged after crystallisation from benzene.

The 5,6-dihydro-11-hydroxy-6-oxo-morphanthridine used above may be obtained as follows:

10 parts of sodium borohydride are added gradually to a stirred, cooled suspension of 40 parts of 5,6-dihydro-6,11-dioxo-morphanthridine in 400 parts of methanol, the temperature of the reaction mixture being kept at 0–5° C. The mixture is stirred for 1 hour at 0–5° C. and is then diluted with 300 parts of water and the aqueous mixture is acidified with hydrochloric acid and filtered. The solid residue is crystallised from aqueous dimethylformamide and there is thus obtained 5,6-dihydro-11-hydroxy-6-oxo-morphanthridine, M.P. 250° C.

Example 2

2 parts of 11-chloro-5,6-dihydro-6-oxo-morphanthridine are added gradually to 5 parts of piperidine with cooling, and the reaction mixture is then heated at 90–95° C. for 15 minutes. The mixture is cooled, diluted with water and the mixture is filtered. The solid residue is treated with cold 3 N aqueous hydrochloric acid and the acid mixture is filtered. The filtrate is made alkaline with ammonium hydroxide and the mixture is filtered. The solid residue is crystallised from aqueous methanol and there is thus obtained 5,6-dihydro-11-piperidino-6-oxo-morphanthridine, M.P. 205° C.

In a similar way using methylaminoethanol as starting material in place of piperidine there is obtained 11-(N-β-hydroxyethyl-N-methylamino)-6-oxo-5,6-dihydro-morphanthridine, M.P. 167–168° C. (from aqueous methanol).

Example 3

To a cooled solution of 10 parts of 11-chloro-5,6-dihydro-6-oxo-morphanthridine in 50 parts of dimethylformamide are added 25 parts of dimethylamine (40% aqueous solution). The mixture is heated on a steam bath for 30 minutes, cooled and filtered. The solid residue is dissolved in 50 parts of ice-cold 3 N hydrochloric acid, the solution is filtered, and the cold filtrate is made alkaline with ammonia. The mixture is filtered and the solid residue is washed with water and is then crystallised from methanol. There is thus obtained 11-dimethylamino-5,6-dihydro-6-oxo-morphanthridine, M.P. 209–210° C.

In a similar way using ethylamine (40% aqueous solution) as the starting material in place of dimethylamine there is obtained 11-ethylamino-5,6-dihydro-6-oxo-morphanthridine, M.P. 178–179° C. (from methanol).

Example 4

2-chloro-11-dimethylamino-5,6-dihydro-6-oxo-morphanthridine, M.P. 206–207° C. (from methanol) is obtained from 2,11-dichloro-5,6-dihydro-6-oxo-morphanthridine and dimethylamine (40% aqueous solution) in dimethylformamide according to the process as described in Example 3.

The 2,11-dichloro-5,6-dihydro-6-oxo-morphanthridine, M.P. 244° C. with decomposition, used as starting material in the above process is obtained from 2-chloro-5,6-dihydro-11-hydroxy-6-oxo-morphanthridine and thionyl chloride according to the process as described in Example 1.

The 2-chloro-5,6-dihydro-11-hydroxy-6-oxo-morphanthridine, M.P. 270–272° C. (from aqueous dimethylformamide), is obtained by reduction of 2-chloro-5,6-dihydro-6,11-dioxo-morphanthridine with sodium borohydride according to the process as described in Example 1.

The 2-chloro-5,6-dihydro-6,11-dioxo-morphanthridine may be obtained from a stirred, cooled suspension of 3 parts of 2-amino-5,6-dihydro-6,11-dioxo-morphanthridine in 20 parts of 5 N hydrochloric acid by adding a solution of 1 part of sodium nitrite in 10 parts of water, keeping the temperature below 5° C. The mixture is stirred 30 minutes and is then added slowly to a solution of 2 parts of cuprous chloride in 10 parts of concentrated hydrochloric acid keeping the temperature below 10° C. The mixture is allowed to warm up to 18–20° C. and is then heated on a steam bath for 30 minutes, and filtered hot. The solid residue is crystallised from dimethylformamide, and there is thus obtained 2-chloro-5,6-dihydro-6,11-dioxo-morphanthridine, M.P. 300° C.

The 2-amino-5,6-dihydro-6,11-dioxo-morphanthridine is obtained from 35 parts of 5,6-dihydro-2-nitro-6,11-dioxo-morphanthridine by dissolving in 500 parts of hot N sodium hydroxide, cooling the solution and then hydrogenating at 22° C. and 21 atmospheres pressure using 5 parts of palladium charcoal (5%) as catalyst. The mixture is filtered and the filtrate is made strongly acid with hydrochloric acid and then boiled for 30 minutes. The cooled solution is made alkaline with ammonia and filtered. The solid residue is crystallised from methanol giving 2-amino-5,6-dihydro-6,11-dioxo-morphanthridine, M.P. 269–270° C.

The 5,6-dihydro-2-nitro-6,11-dioxo-morphanthridine is obtained by treating a cooled, stirred solution of 20 parts of 5,6-dihydro-6,11-dioxo-morphanthridine in 200 parts of concentrated sulphuric acid with 20 parts of nitric acid (density=1.42) keeping the temperature below 14° C. The temperature is then allowed to rise to 22° C. and the mixture is poured on ice and filtered. The solid residue is washed with water, crystallised from dimethylformamide and there is thus obtained 5,6-dihydro-2-nitro-6,11-dioxo-morphanthridine, M.P. above 350° C.

Example 5

To a solution of 3 parts of 11-diethylamino-5,6-dihydro-6-oxo-morphanthridine in 10 parts of methanol is added an excess of ethereal hydrogen chloride and the mixture is filtered. The solid residue is crystallised from methanol and there is thus obtained 11-diethylamino-5,6-dihydro-6-oxo-morphanthridine hydrochloride which crystallises with one molecule of methanol of crystallisation, M.P. 166° C. with decomposition.

Example 6

A mixture of 100 parts of 5,6-dihydro-11-dimethylamino-6-oxo-morphanthridine and 70 parts of lactose is granulated with 10% gelatin solution and the granules are passed through a 16-mesh screen. The granules are then dried and passed through a 30-mesh screen. 20 parts of maize starch and 2 parts of magnesium stearate are then added to the granules, which are then compressed to give tablets containing 100 mgm., 250 mgm. or 500 mgm. of 5,6-dihydro-11-dimethylamino-6-oxo-morphanthridine and which are suitable for oral administration to man for therapeutic purposes.

The 100 parts of 5,6-dihydro-11-dimethylamino-6-oxo-morphanthridine are replaced by 100 parts of 5,6-dihydro-11-diethylamino-6-oxo-morphanthridine or by 100 parts of 5,6-dihydro-11-piperidino-6-oxo-morphanthridine and there is likewise obtained tablets containing 100 mgm., 250 mgm. or 500 mgm. of active ingredient which are suitable for oral administration to man for therapeutic purposes.

What we claim is:

1. A compound selected from the group consisting of morphanthridine derivatives of the formula:

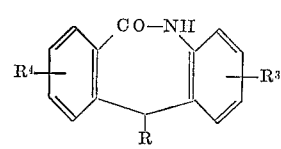

wherein R stands for —NR¹R², wherein R¹ and R² are selected from the group consisting of hydrogen, alkyl radicals of up to 4 carbon atoms, hydroxyalkyl radicals of up to 4 carbon atoms and taken together are lower alkylene forming with the nitrogen atom a lower alkyleneimino ring, and wherein $R^3$ and $R^4$ are selected from the group consisting of hydrogen and halogen atoms, and the pharmaceutically-acceptable salts thereof.

2. A compound according to claim 1 wherein R is the N-piperidino radical.

3. A compound according to claim 1 wherein $R^3$ is chlorine and $R^4$ is hydrogen.

4. A compound selected from the group consisting of 5,6 - dihydro - 11 - diethylamino-6-oxo-morphanthridine, 5,6-dihydro-11-dimethylamino-6-oxo-morphanthridine and 5,6-dihydro-11-piperidino-6-oxo-morphanthridine.

References Cited by the Examiner

UNITED STATES PATENTS

| | | | |
|---|---|---|---|
| Re. 25,502 | 12/1963 | De Beer | 167—65 |
| 2,877,156 | 3/1959 | Janssen et al. | 167—65 |
| 3,084,155 | 4/1963 | Winthrop et al. | 260—239.3 |
| 3,173,913 | 3/1965 | Van der Stelt | 260—239.3 |

OTHER REFERENCES

Wagner, et al., "Synthetic Organic Chemistry" (New York, 1953), pages 665–670.

HENRY R. JILES, *Acting Primary Examiner.*

ALTON D. ROLLINS, *Assistant Examiner.*